United States Patent [19]

Graf

[11] Patent Number: 5,495,410
[45] Date of Patent: Feb. 27, 1996

[54] LEAD-THROUGH ROBOT PROGRAMMING SYSTEM

[75] Inventor: Timothy L. Graf, Lake Elmo, Minn.

[73] Assignee: Minnesota Mining and Manufacturing Company, St. Paul, Minn.

[21] Appl. No.: 289,898

[22] Filed: Aug. 12, 1994

[51] Int. Cl.$^6$ .......................... G05B 19/42; G05B 19/18; B25J 9/18
[52] U.S. Cl. ...................... 364/191; 364/167.01; 395/90; 318/568.11
[58] Field of Search .................. 364/167.01, 191; 395/90, 94, 97; 318/568.16, 568.21, 568.11

[56] References Cited

U.S. PATENT DOCUMENTS

| | | | |
|---|---|---|---|
| 4,408,286 | 10/1983 | Kikuchi et al. | 345/95 |
| 4,495,588 | 1/1985 | Nio et al. | 395/86 |
| 4,528,632 | 7/1985 | Nio et al. | 364/474.31 |
| 4,589,810 | 5/1986 | Heindl et al. | 414/5 |
| 4,677,276 | 6/1987 | Nio et al. | 219/125.12 |
| 4,761,596 | 8/1988 | Nio et al. | 395/94 |
| 4,886,529 | 12/1989 | Hashimoto et al. | 451/5 |
| 4,969,108 | 11/1990 | Webb et al. | 395/94 |
| 4,998,050 | 3/1991 | Nishiyama et al. | 318/568.1 |
| 5,179,653 | 1/1993 | Fuller | 395/156 |
| 5,231,693 | 7/1993 | Backes et al. | 395/00 |
| 5,251,127 | 10/1993 | Raab | 364/413.13 |
| 5,305,203 | 4/1994 | Raab | 364/413.13 |
| 5,400,244 | 3/1995 | Watanabe et al. | 364/424.02 |

FOREIGN PATENT DOCUMENTS

| | | |
|---|---|---|
| 3045094 | 7/1982 | Germany . |
| 3045094A1 | 7/1982 | Germany . |
| 3223896A1 | 1/1984 | Germany . |
| 60-31614 | 2/1985 | Japan . |
| 60-205721 | 10/1985 | Japan . |
| 60-205720 | 10/1985 | Japan . |
| 61-175805 | 8/1986 | Japan . |
| 1-196506 | 8/1989 | Japan . |
| 4-271408 | 9/1992 | Japan . |
| 5-197416 | 8/1993 | Japan . |
| 2229296A | 9/1990 | United Kingdom . |

OTHER PUBLICATIONS

Deneb Brochure, *Deneb's Turnkey Approach to Simulation*

Primary Examiner—Paul P. Gordon
Attorney, Agent, or Firm—Gary L. Griswold; Walter N. Kirn; James J. Trussell

[57] ABSTRACT

A lead-through robot programming system for programming a robot to drive an end effector through a series of desired path points along a desired path with respect to a workstation. The system includes a six DOF digitizing arm having a working end, an end effector model mounted to the working end, a workstation model, and a programming computer system. A user manipulates the working end to move the end effector model through a model path with respect to the workstation model. At selected model path points, the digitizing arm generates model path point data representing the position and orientation of the end effector model with respect to the workstation model. The programming computer system includes a video monitor, a user interface, and memory for storing data including the model path point data, robot simulation and motion program generation software, and models of the robot, workstation and end effector. The simulation and motion program generation software is run as a function of the model path point data to generate motion-control program segments that direct the robot to drive the end effector through the desired path. The simulation and motion program generation software also generates graphic images of 0the robot driving the end effector through the desired path. Interactively controlling the simulation and motion program generation software through the interface, and using visual feedback provided by the monitor, the user performs collision and out-of-range checking and singularity point identification, and optimizes the motion-control program segments.

14 Claims, 4 Drawing Sheets

OTHER PUBLICATIONS

Requirements, one page; Deneb Robotics, Inc. (undated).

Deneb Brochure, *Corporate Profile: Deneb Robotics, Inc.*, four pages; 5101—Mar. 1993.

Deneb Brochure, *UltraSpot™—The Simulation and Programming Tool for Spot Welding;* Deneb Robotics, Inc., Copyright 1993.

Deneb Brochure, *UltraArc™—The Simulation and Programming Tool for Arc Welding;* Deneb Robotics, Inc., Copyright 1993.

Deneb Brochure, *UltraPaint™—The Simulation and Programming Tool for Robot Painting;* Deneb Robotics, Inc., Copyright 1993.

Deneb Brochure, *Quest™—The New Standard for Discrete Event Simulation;* Deneb Robotics, Inc., Copyright 1993.

Hirzinger, Dr. Gerhard. "Sensor Programming—A new Way for Teaching a Robot Paths and Sensory Patterns Simultaneously" in *Robotics and Artificial Intelligence* (M. Brady, L. Gerhardt, and H. Davidson), pp. 395–410; Springer–Verlag 1984.

Kent, Ernest W. "Robotics" in *McGraw–Hill Encyclopedia of Science & Technology* (6th Edition), pp. 496–500; McGraw–Hill, Inc., Copyright 1987.

LEAD-THROUGH ROBOT PROGRAMMING SYSTEM

TECHNICAL FIELD

The present invention relates generally to robots and other computer-controlled multi-axis manipulator systems. In particular, the present invention is a lead-through programming system for industrial robots.

BACKGROUND OF THE INVENTION

Robot and other multi-axis manipulator systems are used in an increasing number of industrial and commercial applications to perform precise and repetitive movements with a minimum of human intervention. For example, robots are used to apply spray paint to automobile door panels, to weld components together, to abrade material from workpieces and to apply sealant to joints. Properly programmed robots are highly repeatable and reliable.

Robot systems typically include a robot and a computer-based controller. Commonly used six-axis industrial robots include an arm assembly having one end mounted to a base, and a wrist on the opposite end. A grasping mechanism configured to receive the tool or other workpiece to be moved by the robot is mounted to the wrist. The grasping mechanism and workpiece, or whatever devices are mounted to the robot wrist, are together known generally as an end effector.

The robot arm assembly can be driven about waist, shoulder and elbow axes (representing three degrees of freedom) to position the wrist and end effector at any desired position within the operating range of the robot. These positions can be specified in terms of the positions of the end effector on each of the three-dimensional x, y and z axes of a robot cartesian coordinate system (i.e., $[P_x, P_y, P_z]$). For some robotic applications, specifying only the position of the end effector is sufficient to enable the robot to perform a desired operation. For other robotic applications, however, both the position and the orientation of the end effector are important. Thus, at each position the robot wrist can be rotated about orthogonal x, y and z axes (representing an additional three degrees of freedom) to orient the end effector at desired orientations within the wrist range of motion. The orientation of the end effector can be specified in terms of the extent of the angular rotation of the wrist on each of the three axes (i.e., $[\theta_x, \theta_y, \theta_z]$). The position and orientation of the end effector at any point within the operating range of the robot can therefore be described in terms of its position and orientation in the robot coordinate system (i.e., $[p_x, p_y, p_z, \theta_x, \theta_y, \theta_z]_{robot}$).

The computer-based robot system controller is programmed with a robot drive program. When executed by the controller, motion-control program segments of the drive program cause the robot arm assembly and wrist to drive the end effector through a predetermined or desired path of motion with respect to a workstation. In abrasive applications, for example, the robot will typically drive the workpiece (e.g., a turbine blade, golf club head or other part) with respect to a fixed backstand that supports a moving wheel, belt or other abrasive product. Responsive to the robot drive program, the robot drives the workpiece through the desired path of motion to abrade the workpiece with the abrasive product in the desired manner. In other applications, including abrasive applications, the robot drives a tool or other end effector through a desired path of motion with respect to a fixed workpiece or other workstation.

The controller may also be programmed to control other application parameters in synchronization with the path of motion. Examples of such path-synchronized parameters include the actuation of a welder in robotic welding applications and the actuation of a paint sprayer in robotic painting applications. In the robotic abrasive application described above, the backstand can include a pneumatic cylinder or other force actuator for controllably forcing the abrasive product into engagement with the workpiece. Force-control program statements or segments in the robot drive program are executed by the controller to activate the force actuator (either constantly or variably) as the workpiece is driven through the desired path of motion. Other systems include a separate computer for executing force-control segments that are indexed to or otherwise synchronized with the motion-control program segments.

The robot system controller must be programmed with the motion-control or force-control program segments, or both. A number of known programming techniques are typically used for this purpose, including the teach pendant, lead-through, kinematic model and computer simulation methods.

The teach pendant programming method is disclosed generally in the U.S. Pat. No. 4,589,810 (Heindl et al.). This "on-line" programming approach makes use of the robot to be programmed and a technician-actuated interface including a joystick and/or switches coupled to the robot controller. Using the interface, the technician will actuate the robot and move the end effector through a programming path of motion with respect to the workstation. The points taught during programming will correspond to the desired path of motion. At a selected series of programming points along the programming path of motion, the technician actuates the interface and causes the controller to store programming path point data characterizing the position and orientation of the end effector at each of the programming points. Motion-control program segment generation software run by the controller then uses the programming path point data to generate the motion-control program segments included in the drive program. When the drive program is executed by the controller, the motion-control program segments will cause the robot to drive the end effector smoothly through the programming path points along the desired path of motion. The technician will typically select the programming path points through direct visual observation or feedback of the positions of the end effector with respect to the workstation. Unfortunately, the teach pendant programming method can be relatively slow and inefficient. Furthermore, because it is performed on-line with the actual robot to be programmed, the teach pendant programming method results in robot down time and associated productivity losses.

Lead-through robot programming is disclosed generally in the U.S. Pat. No. 4,408,286 (Kikuchi et al.). This programming method is similar to the teach pendant method described above in that the robot is moved through a programming path of motion to selected programming path points, and the motion-control program segments are generated using the programming point data. Rather than using a remotely located interface device to move the robot to the programming path points, however, the technician will actuate a force sensor or other control mechanism on the robot (typically on the end effector) to move the robot to the programming path points. Because these lead-through programming methods require the technician to be in close proximity to the robot, they are typically not used with heavy or high-powered robots.

Kinematic programming methods offer some of the advantages of lead-through programming methods, but do not require the technician to be in close physical proximity to the robot while it is being programmed. These methods make use of a relatively lightweight robot model or teaching arm having the same kinematic design as the robot being programmed. The teaching arm is then positioned at the same position with respect to the workpiece as the robot being programmed, or at the same relative position with respect to a model or duplicate of the workstation. During use, the teaching arm is moved by hand through a programming path of motion that corresponds to the desired path of motion. Encoders on the teaching arm monitor the relative positions of the arm sections with respect to one another as the arm is moved through the programming path of motion. The robot controller then generates motion-control program segments that duplicate the relative positions monitored by the encoders. These programming methods are robot-specific, however, because they require a separate arm for each type of robot being programmed. They also typically require a duplicate workspace because it usually impractical to substitute the teaching arm for the actual robot being programmed.

Computer graphical off-line robot simulation and programming methods are also known. These programming methods make use of robot simulation software that includes graphical and mathematical models of the robot, its end effector and the workstation. The simulation software is typically run on computer workstations coupled to a monitor, and generates simulated three-dimensional graphical video images of the robot driving the end effector with respect to the workstation. Graphics such as cartesian coordinates and text displayed on the monitor also mathematically describe the positions of the end effector with respect to the workstation represented by the graphical images. Using a mouse and keyboard, the technician interactively interfaces with the software to move the image of the end effector or vector tag points to the selected programming path points with respect to the image of the workstation. The simulation software includes motion-control program segment generation software capable of generating the robot drive programs from the selected programming path points. By observing the simulated graphical image of the robot driving the end effector through the programmed path of motion, and interfacing with the simulation software through the mouse or keyboard, the technician can also optimize the motion-control program. Other functions available from the simulation software include out-of-range checking and collision checking. Simulation software of this type is commercially available from a number of software vendors, including Deneb Robotics Inc. of Auburn Hills, Mich. The IGRIP software package available from Deneb Robotics is one example of such simulation software. Although these off-line simulation and programming methods reduce the amount of down time required to program the robot, they can be slow and inefficient to use. It is also difficult to accurately program a robot to move about a desired three-dimensional path using these tools.

Force-control program segments used in conjunction with abrasive robot applications of the type discussed above are typically generated by the robot controller or other control computer from programming force point data. While using teach pendant, lead-through or other known programming methods to move the robot to the programming path points, the technician will simultaneously and manually enter programming force point data through the controller interface. The force point data is data representative of the desired forces to be exerted by the force actuator while the end effector is at the corresponding programming path points. Force-control program segment generation software run by the robot controller generates the force-control program segments using the programming force points. When executed by the controller, the force-control program segments will cause the robot to drive the force actuator through the programming force points and desired force regime.

It is evident that there is a continuing need for improved robot programming systems. In particular, there is a need for improved on-line and off-line programming methods that minimize the amount of robot down time and associated lost productivity. The robot programming methods should be capable of efficiently and accurately generating and optimizing motion-control programs. Programming methods of this type capable of efficiently and accurately generating force-control and other path-synchronized data would also be useful.

SUMMARY OF THE INVENTION

The present invention is a system for efficiently and accurately programming a robot or other multi-axis manipulator to drive an end effector through a series of predetermined points along a desired path of motion with respect to a workstation. One embodiment of the system includes a human-manipulable end effector model, an encoder, a video monitor, electronic memory, and a programmable computer coupled to the encoder, to the video monitor, and to the memory. A six degree of freedom digitizing arm can be used as the encoder. The end effector model is movable through a series of model path points along a model path of motion with respect to the workstation. The model path points and model path of motion correspond to the desired path points and the desired path of motion. Model path point data representative of the position and orientation of the end effector model with respect to the workstation at each of the model path points is provided by the encoder. Data including the model path point data, robot simulation and motion program generation software and robot motion-control program segments is stored in the electronic memory. The programmable computer includes motion program processing means, video processing means and an output port for communicating the robot motion-control program segments to the robot. The motion program processing means executes the robot simulation and motion program generation software as a function of the model path point data to generate robot motion-control program segments for causing the robot to drive the end effector through the desired path of motion, and for storing the robot motion-control program segments in the motion program memory. The video processing means executes the robot simulation and motion program generation software as a function of the model path point data and causes the video monitor to generate a graphic display of the robot driving the end effector through the desired path of motion.

Another embodiment of the invention includes robot model memory for storing robot model data, and range checking memory for storing robot out-of-range checking software. Out-of-range processing means execute the out-of-range checking software as a function of the robot model data and the model path point data to generate out-of-range determination data representative of whether the robot can drive the end effector through the desired path of motion represented by the motion-control program segments. Outof-range video processing means causes the video monitor to generate an out-of-range display as a function of the out-of-range determination data and representative of whether the robot can drive the end effector through the desired path of motion.

Yet another embodiment of the invention includes workstation model memory, robot model memory, end effector model memory and collision checking memory. Workstation model data is stored in the workstation model memory. Robot model data is stored in the robot model memory. End effector model data is stored in the end effector model memory. Robot collision checking software is stored in the collision checking memory. Collision processing means execute the collision checking software as a function of the workstation model data, robot model data, end effector model data and the model path point data to generate collision determination data representative of whether the robot can drive the end effector model through the desired path of motion represented by the motion-control program segments free from collisions with the workstation. Collision video processing means causes the video monitor to generate a collision display as a function of the collision determination data, to assist in determining whether the robot can drive the end effector through the desired path of motion free from collisions with the workstation.

DETAILED DESCRIPTION OF THE INVENTION

Figure 1:
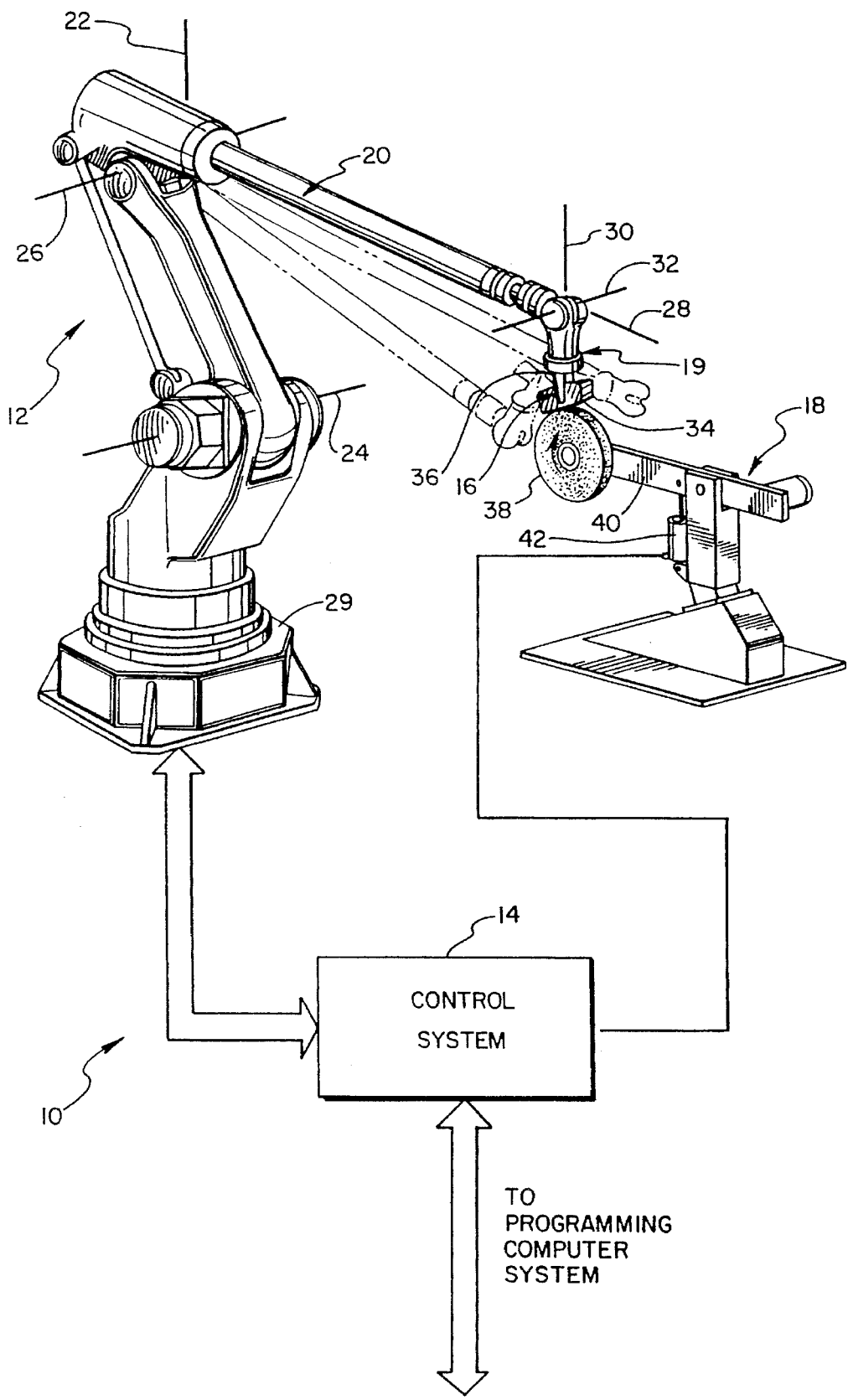
FIG. 1 is a graphic and block diagram representation of a workstation and robot system that can be programmed using the lead-through programming system of the present invention.

FIG. 1 is an illustration of a robot system 10 that can be programmed either on-line or off-line using the lead-through programming system of the present invention. As shown, robot system 10 includes a multi-axis manipulator such as robot 12 which, under the control of a computer-based controller 14, drives an end effector 16 along a desired path of motion with respect to a workstation 18. Robots such as 12 are well known and commonly used in a wide variety of industrial applications. In the embodiment shown in FIG. 1, end effector 16 is mounted to a wrist 19 on the end of an arm assembly 20. Arm assembly 20 can be driven about a waist axis 22, shoulder axis 24 and elbow axis 26 (i.e., three degrees of freedom) to position the end effector 16 at desired positions within the operating range of the robot 12. Wrist 19 can be driven about an x rotational axis 28, y rotational axis 32 and z rotational axis 30 (i.e., three degrees of freedom) to orient the faceplate of the wrist and therefore end effector 16 at desired orientations within the operating range of robot 12. The position and orientation of the faceplate of wrist 19 at any desired path point can be described in terms of its position (p) and angle of rotation (θ) with respect to orthogonal x, y and z axes of a robot cartesian coordinate system (i.e., $[p_x, p_y, p_z, \theta_x, \theta_y, \theta_z]_{robot}$). For purposes of convention, the center of the robot base 29 can be designated the origin or reference point of the robot coodinate system.

In the embodiment shown in FIG. 1, robot system 12 is configured for automated deburring, finishing and other abrasive operations on workpieces 34. In addition to the workpiece 34, end effector 16 therefore includes a jaw-type gripper 36 for releasably grasping the workpiece. The position of any given point and surface of end effector 16 can be described in terms of its position (p) and angle of rotation (θ) with respect to orthogonal x, y and z axes of an end effector cartesian coordinate system (i.e., $[p_x, p_y, p_z, \theta_x, \theta_y, \theta_z]_{effector}$). The origin and orientation of the end effector coordinate system can be referenced to the faceplate of robot wrist 19.

Workstation 18 includes a motor-driven abrasive wheel 38 mounted to a backstand 40. Workstation 18 is a force-controlled device in the embodiment shown, and includes an actuator 42. The position of any given point and surface on workstation 18, including the surfaces of abrasive wheel 38 on which workpieces 34 are abraded, can be described in terms of its position (p) and angle of rotation (θ) with respect to orthogonal x, y and z axes of a workstation cartesian coordinate system (i.e., $[p_x, p_y, p_z, \theta_x, \theta_y, \theta_z]_{workstation}$). The center of the workstation base can be designated as the origin of the workstation coordinate system.

Controller 14 is programmed with a drive program that is executed to effect the operation of robot system 10. In this embodiment, the drive program includes both a motion-control program segment and a force-control program segment. In response to the motion-control program segment, controller 14 drives robot 12 and its end effector 16 through a predetermined or desired path of motion with respect to workstation 18. As the end effector 16 is driven through the desired path of motion, workpiece 34 is moved with respect to wheel 38 to abrade the workpiece. Simultaneously with this motion of the workpiece 34, controller 14 drives actuator 42 in response to the force-control program segment in a manner causing the abrasive wheel 38 to apply force to the workpiece 34. The motion-control program segment and force-control program segment of the drive program are synchronized so the abrasive wheel 38 applies the desired forces to workpiece 34 when the workpiece is at the desired corresponding positions along its path of motion. It is to be understood that the use of a force-control program segment to control the force applied to wheel 38 is just one example of path-synchronized parameters that can be controlled by controller 14. For example, other parameters that can be controlled in a synchronized manner with the motion of robot 12 include the actuation of a welder in robotic welding applications, and the actuation of a paint spray gun in robotic painting applications. Alternatively, controller 14 can execute programs controlling the position and orientation of a positioning table.

Figure 2:
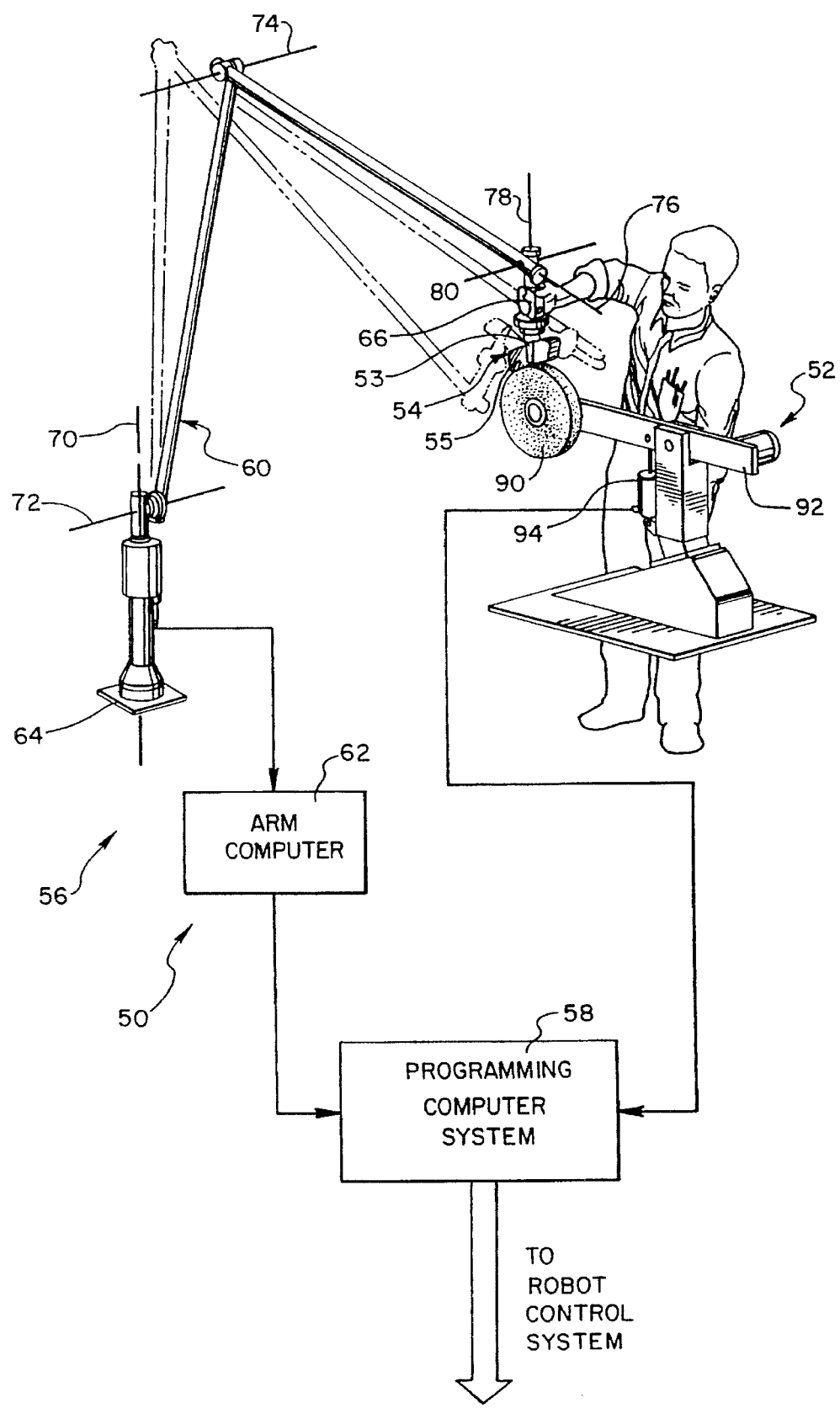
FIG. 2 is a graphic and block diagram representation of the lead-through robot programming system of the present invention.

The lead-through programming system 50 of the present invention is illustrated generally in FIG. 2. As shown, programming system 50 includes a workstation model 52, end effector model 54, an encoder such as digitizing arm system 56 and programming computer system 58. End effector model 54 is used to simulate the actual end effector 16, but need not be a duplicate or complete replica of the actual end effector, and thus in the illustrated embodiment need not simulate gripper 36. However, end effector model 54 should simulate the surfaces of the actual workpiece 34 that will be interacting with workstation 18 during the operation of robot system 10, and any other surfaces of the workpiece that may be of importance during the operation of the robot system. In the embodiment shown in FIG. 2, end effector model 54 includes a clamping mechanism 53, and a workpiece model 55, which is a duplicate of the workpiece 34.

Workstation model 52 is used to simulate the actual workstation 18 with which the robot system 12 is being programmed to operate. Although it is not necessary for workstation model 52 to be a duplicate, or even a complete replica of the actual workstation 18, the workstation model should simulate the surfaces of the actual workstation that the workpiece 34 will contact during the programming operation, and thus in the illustrated embodiment should include at least that portion of wheel 38 to be contacted by workpiece 34. In the embodiment shown in FIG. 2, workstation model 52 is a duplicate of the actual workstation 18, and includes an abrasive wheel model 90 and backstand model 92. The use of a workstation model 52 such as that shown and described with reference to FIG. 2 is necessary when programming system 50 is used for off-line robot programming operations. However, programming system 50 can also be used in connection with the actual workstation 18 (FIG. 1) for on-line robot programming operations.

In the embodiment shown in FIG. 2, workstation model 52 also includes a force sensor 94. Force sensor 94 is a strain-gauge or other device mounted to the workstation model 52 in such a manner that it can detect forces (i.e., the path-synchronized parameter in the illustrated embodiment) applied to wheel model 90 during the operation of programming system 50. Force data representative of the sensed forces are generated by force sensor 94 and coupled to programming computer system 58.

In the embodiment shown and described herein, digitizing arm system 56 includes a six degree of freedom digitizing arm 60 that is interfaced to an arm computer 62. One end of arm 60 is mounted to base 64, and the other end of the arm includes a working end 66 with finger actuated control switches 68. End effector model 54 is mounted to a faceplate on working end 66. Digitizing arm systems such as 56 are commercially available, and one embodiment of lead-through programming system 50 includes a digitizing arm system 56 of the type available from Faro Medical Technologies of Lake Mary, Fla., and described generally in the U.S. Pat. No. 5,251,127 (Raab). When grasped at working end 66, arm 56 is easily movable about a first axis 70, a second axis 72 and a third axis 74 (representing three degrees of freedom) to position the faceplate of the working end and therefore end effector model 54 at desired positions within the operating range of the arm. Working end 66 can also be easily moved about an x rotational axis 76, y rotational axis 80 and z rotational axis 78 to orient working end faceplate and end effector model 54 at desired orientations within the operating range of arm 60. The position and orientation of the faceplate of working end 66 at any desired point can be described in terms of its position (p) and angle of rotation with respect to orthogonal x, y and z axes of an arm cartesian coordinate system (i.e., $[p_x, p_y, p_z, \theta_x, \theta_y, \theta_z]_{arm}$). For purposes of convention, arm base 64 can be designated the origin of the arm coordinate system.

The position of any given point and surface on end effector model 54, including the surfaces of workpiece model 55, can be described in terms of its position (p) and angle of rotation ($\theta$) with respect to orthogonal x, y and z axes of an end effector model cartesian coordinate system (i.e., $[p_x, p_y, p_z, \theta_x, \theta_y, \theta_z]_{effector\ model}$). The origin and orientation of the end effector model coordinate system can be referenced to a predetermined point and orientation on the faceplate of working end 66.

Although not shown in FIG. 2, digitizing arm 66 includes sensors that provide angle position signals to computer 62 representative of the angular positions of the arm sections about each of the axes 70, 72, 74, 76, 78 and 80. Computer 62 includes a position computation program that mathematically relates the angular positions of the arm sections and the arm kinematics (including the length of the arm sections) to the actual position and orientation of the faceplate of working end 66 in the arm coordinate System. In response to the actuation of control switches 68, arm computer 62 executes the position computation program as a function of the angle position signals to compute the position and orientation of the faceplate of working end 66 $[p_x, p_y, p_z, \theta_x, \theta_y, \theta_z]_{arm}$ at the then-current position of the end effector. Although the position computation program is executed by a separate arm computer 62 in the embodiment shown, programming computer system 58 can be programmed to perform this function in other embodiments.

During the operation of lead-through programming system 50, arm system 56 is used by a technician to generate model path points representative of the position and orientation of the end effector model 54 with respect to the workstation model 52. To perform this programming operation, the technician grasps working end 66, and manipulates the working end to move the end effector model 54 through a model path of motion with respect to the workstation model 52. The model path of motion is a path that corresponds to or replicates the desired path of motion of robot end effector 16 with respect to the actual workstation 18 (FIG. 1).

With particular reference to the embodiment shown in FIG. 2, the technician will manipulate the working end 66 to move workpiece model 55 through a model path of motion with respect to abrasive wheel model 90. While the end effector model 54 is being moved through the model path of motion, the technician will actuate control switches 68 to cause arm computer 62 to "digitize" the positions of the end effector model 54 at discreet model path points along the model path of motion. Arm computer 62 generates model path point data representative of the position and orientation of the end effector model 54 at each of the model path points $[p_x, p_y, p_z, \theta_x, \theta_y, \theta_z]_{arm}$. In one embodiment of programming system 50, control switches 68 can be actuated in a manner causing arm computer 62 to generate the model path point data either continuously or at specific model path points as the end effector model 54 is moved through the model path of motion. In particular, one of control switches 68 can be depressed to cause the arm computer 62 to periodically sample and generate the model path point data. Another of control switches 68 can be depressed each time it is desired to have arm computer 62 generate model path point data for a desired model path point. During this model path point sampling operation it is necessary to obtain a sufficient number of model path points to enable the programming computer system 58 to generate a motion-control program segment that will cause the robot 12 to drive end effector 16 through the path of motion with the desired accuracy and speed. The model path point data generated by arm computer 62 is transmitted to and stored in programming computer system 58.

While moving the end effector model 54 through the model path of motion, the technician will also urge the end effector model into contact with the workstation model 52 to generate a model force regime. The model force regime is a sequence of forces that corresponds to or replicates the desired force regime to be exerted by the actual workstation 18 (FIG. 1) as the robot 12 drives end effector 16 along the desired path of motion with respect to the actual workstation. Force sensor 94 generates model force point data representative of the sensed forces, and transmits the model force point data to programming computer system 58. Programming computer system 58 stores the model force point data in a manner that is synchronized with or indexed to the model path point data.

Figure 3:
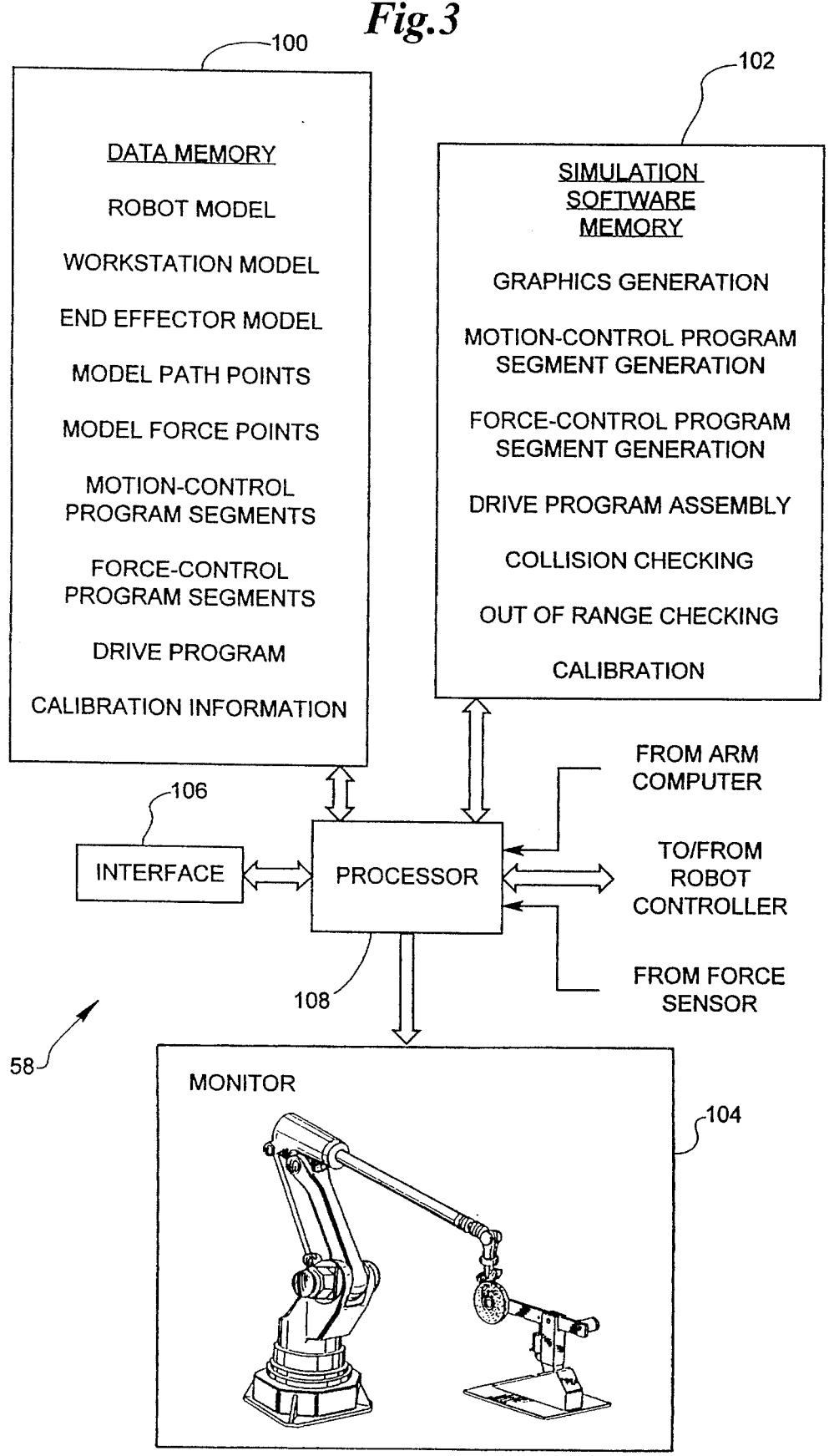
FIG. 3 is a detailed functional block diagram of the programming computer system shown in FIG. 2.

Programming computer system 58 can be described with reference to the functional block diagram in FIG. 3. As shown, computer system 58 includes data memory 100, program memory 102, video dispaly means (shown as video monitor 104), and interface 106, all of which are interfaced to a processor 108. Interface 106 will typically include both a keyboard and mouse that are used by the technician to interface with the programming computer system 58 in a conventional manner. Workstations such as those commercially available from Sun, Silicon Graphics and Hewlett-Packard will typically be used as the processor 108 because the efficient execution of the simulation software stored in memory 102 requires more computing power than is currently available on most personal computers (PCs). However, with the rapidly increasing computing capabilities of PCs, and as the efficiency of the simulation software increases, it is expected that PC platforms will in the future be capable of functioning as the processor 108. Monitor 104 can be any commercially available display monitor capable of generating text or graphics images of the desired quality or both.

The executable simulation software run by processor 108 during the operation of lead-through programming system 50 is stored in memory 102. As shown, computing functions performed by the simulation software include graphics generation, motion-control program segment generation, force-control program segment generation, drive program assembly, collision checking, out-of-range checking and calibration. Data used by processor 108 in the course of executing the simulation software, and data generated by the execution of the simulation software, is stored in data memory 100. Examples of the data stored in memory 100 include robot model data, workstation model data, end effector model data, model path points, model force points, the motion-control program segment, the force-control program segment, the drive program and calibration information.

The robot model data stored in memory 100 includes data representative of the kinematics, three dimensional (3D) physical shell and other characteristics and features of the robot 12 used by the simulation software. This data is referenced to the robot coordinate system, and includes a mathematical description of all pertinent aspects of the robot 12 with which programming system 50 is used. Also included in the robot model data is data characterizing a graphical representation of the robot 12, and used to generate simulated 3D graphic displays of the robot on monitor 104. The degree to which the robot model data accurately characterizes the robot 12 and its graphical image (i.e., the accuracy of the model) will depend upon a variety of factors including the sophistication of the simulation software, the capabilities of processor 108 and the degree of accuracy and functions desired from the operation of programming system 50. For example, if collision checking functions (described below) need not be performed to a high degree of accuracy, a simple geometric model of the physical shell of robot 12 will typically suffice, and enable the collision checking function to be performed more quickly.

The end effector model data includes data representative of the 3D physical shell of the end effector 16 mounted to robot 12. This data is referenced to the end effector reference system, and includes a mathematical description of all pertinent aspects of the end effector 16 used on the robot 12. Also included in the end effector model data is data characterizing a graphical representation of the end effector 16, and used to generate simulated 3D graphic displays of the end effector on monitor 104. Again, the accuracy of the end effector model will depend on a variety of factors including the nature of the application of programming system 50. For example, a model of the workpiece 34 is not needed for the operation of programming system 50, but is useful for the collision checking and visualization functions described below.

The workstation model data includes data representative of the 3D physical shell of the workstation 18, and can also include other pertinent features of the workcell surrounding the workstation. This data is referenced to the workstation reference system, and includes a mathematical description of all pertinent aspects of the workstation 18 with which robot 12 is used. Also included in the workstation model data is data characterizing a graphical representation of the workstation 18, and used to generate simulated 3D graphic displays of the workstation on monitor 104. The accuracy of the workstation model can vary depending on the functional requirements of the application of programming system 50. In applications using an abrasive-type workstation such as that shown in FIG. 1, for example, a model of wheel 38 and portions of backstand 40 adjacent the wheel are typically sufficient.

The model path points generated by arm computer 62 while the end effector model 54 is moved through the model path of motion are stored in data memory 100 for subsequent processing by the simulation software. Similarly, the model force points generated by force sensor 94 while the end effector model 54 is moved through the model force regime are stored in data memory 100. Data representative of the motion-control program segments and force-control program segments generated by processor 108 while executing the simulation software can also be stored in data memory 100 before these programs are combined or assembled into the drive programs and downloaded to robot system 10.

The model path points generated by digitizing arm system 56 are referenced to the arm coordinate system. For the simulation software to generate the motion-control program segments from the model path points, the software must translate the model path points to corresponding points in the robot coordinate system. Calibration data relating the robot coordinate system to the arm coordinate system, the robot coordinate system to the workstation coordinate system, and the arm coordinate system to the workstation coordinate system (i.e., a "three-sided triangle" of calibration data referencing the arm, robot and workstation reference systems) is stored in data memory 100 and used for the calibration function. Unless the end effector model 54 is identical to the actual end effector 16 and identically located on the working end 66 and robot wrist 19, respectively, the calibration data will also include data describing the position and orientation of the end effector model in the end effector model coordinate system and the actual end effector in the end effector coordinate system.

Figure 4:
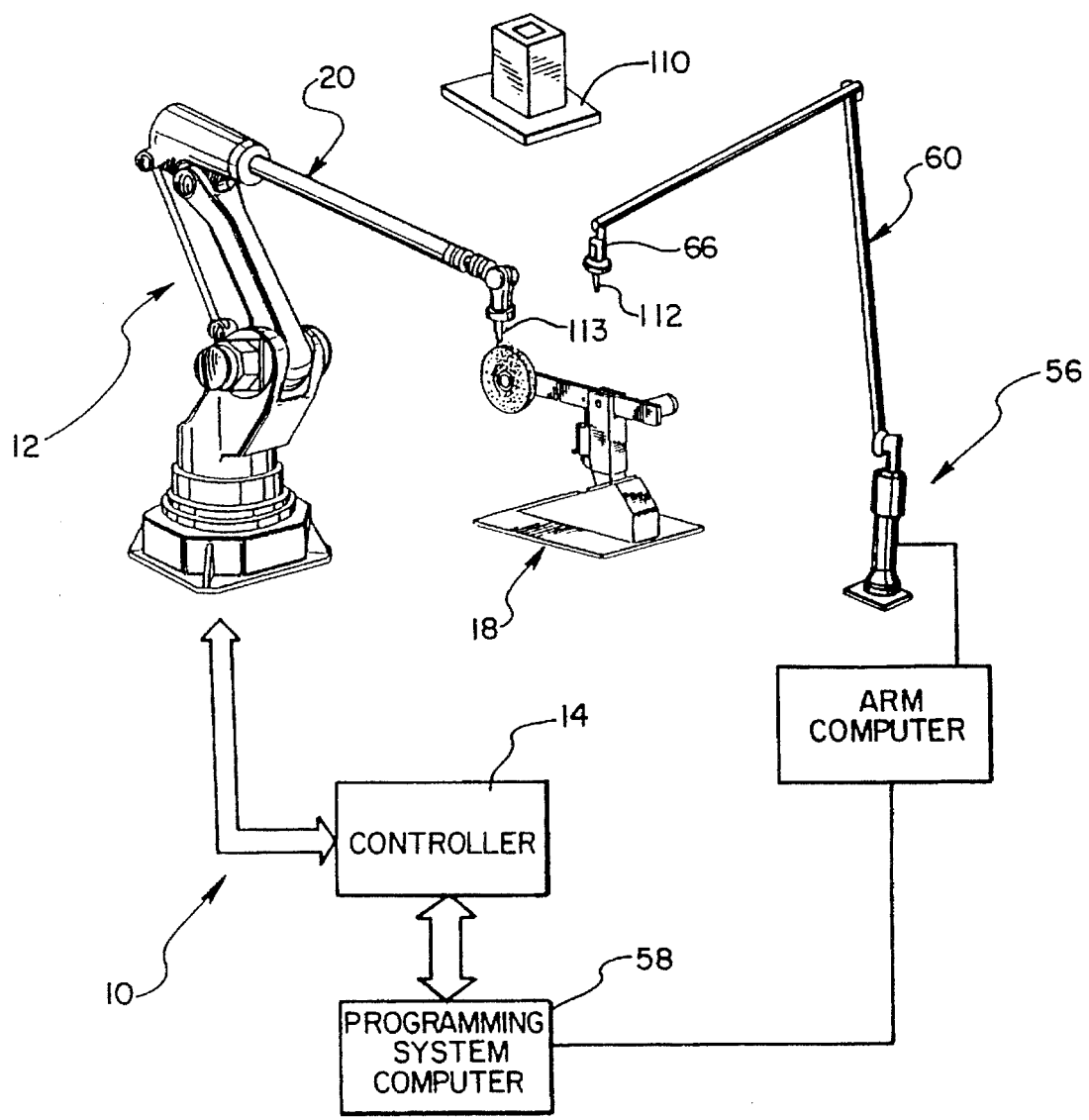
FIG. 4 is a graphic and block diagram representation of the digitizing arm system shown in FIG. 2 with the robot and workstation shown in FIG. 1 and an end effector calibration stand, used in calibration of the programming system.

As described with reference to FIG. 4, the digitizing arm system 56 and programming computer system 58 can be used in conjunction with robot system 10, workstation 18 and an end effector calibration stand 110 to generate the needed calibration data during a programming system set-up procedure. A calibrated pointer 112 can be mounted on the working end 66 when using the arm system 56 during the set-up procedure, while a calibrated pointer 113 can be mounted to the robot wrist 19. During the set-up procedure, the relative positions and orientations of the arm, robot and workstation coordinate systems can be located through the use of three known or predetermined nonlinear calibration points within the coordinate systems. Calibration information relating only two sides of the calibration information data triangle need be empirically determined. Programming computer system 58 can calculate the calibration information data for the third side as a function of the calibration information data for the two known sides.

By way of example, if the workstation coordinate system is used as a reference, the technician can move working end 66 to touch three nonlinear and predetermined workstation calibration points on the workstation 18 with the pointer 112. Control switches 68 are actuated to cause the arm computer 62 to generate data representative of the position of the pointer 112 at each of the three workstation calibration points. Programming computer system 58 is programmed to know the location of the three workstation calibration points within the workstation coordinate system, and with this information can generate calibration data describing the position and orientation of the workstation coordinate system with respect to the arm coordinate system (i.e., calibration information data relating a first leg of the triangle).

Using a joystick or other conventional control interface (not shown in FIG. 4), the technician can then move the robot arm 20 and touch the same three workstation calibration points with the pointer 113. When the pointer 113 is positioned at the workstation calibration points, the robot controller 14 is "queried" by the programming computer system 58 to determine the position of the pointer at the workstation calibration points. Because the location of the three workstation calibration points within the workstation coordinate system are known, and the position of the pointer 113 at each of the calibration points determined, programming computer system 58 can generate calibration information data describing the position and orientation of the workstation coordinate system with respect to the robot coordinate system (i.e., calibration information data relating a second leg of the triangle). Using the calibration information data describing the relationship between the arm and workstation coordinate systems, and between the workstation and robot coordinate systems, the programming computer system 58 can generate calibration information data describing the relationship between the arm coordinate system and the robot coordinate system (i.e., calibration information data relating a third leg of the triangle).

Calibration information data describing the position and orientation of the end effector 16 within the robot coordinate system can be determined using arm system 56. With the end effector 16 (not shown in FIG. 4) mounted to the robot wrist 19, the technician will move working end 66 and touch pointer 112 to three nonlinear and predetermined robot calibration points on the robot (e.g., on the robot wrist), and three nonlinear and predetermined end effector calibration points on the end effector. Control switches 68 are actuated to cause the arm computer 62 to generate data representative of the position of the pointer 112 at each of the three robot calibration points and the three end effector calibration points. Programming computer system 58 is programmed to know where each of the three robot calibration points are with respect to the robot reference system, and where each of the three end effector calibration points are with respect to the end effector reference system. With this information, the programming computer system can generate calibration information data describing the position and orientation of end effector 16 in the robot reference system.

Similarly, the position and orientation of the end effector model 54 in the arm reference system can be determined using arm system 56 and calibration stand 110. Calibration stand 110 includes an end effector model mounting system (e.g., a position-indexed socket) that simulates (e.g., has the same design as) the end effector mounting system on working end 66. The calibration stand 110 also includes three nonlinear stand calibration points that are positioned with respect to the mounting system of the stand in a known manner. Calibration data representative of the relationship between the stand calibration points and the stand mounting system is stored in memory 100. The relationship between the stand calibration points and the stand mounting system can, for example, be measured or provided by the manufacturer.

With the end effector model 54 positioned in the mounting system of calibration stand 110, the technician will move working end 66 and touch pointer 112 to the three stand calibration points, and actuate switches 68 to generate data representative of the position of the three stand calibration points in the arm reference system. Because the relationship between the stand calibration points and the stand mounting system is known, programming computer system 58 can use this information to determine the position of the mounting system in the arm coordinate system.

The technician then moves working end 66 and touches three end effector model calibration points on the end effector model 54. Control switches 68 are actuated to cause the arm computer 62 to generate data representative of the position of the pointer 112 at each of the three end effector model calibration points. Programming computer system 58 is programmed to know where the three end effector model calibration points are in the end effector model refrence system. With this information, the programming computer system 58 can generate calibration information data describing the position of end effector model 54 in the arm reference system. Other methods for generating the calibration information data necessary for applications of programming system 50 will be readily apparent to those skilled in the art. For example, touch pointer 112 may be brought to a fixed point in space, and then an end effector may replace touch pointer 112 and be brought to the same point in space. By touching three points on the end effector to the fixed point in space, the requisite calibration information can be determined.

Simulation software such as that stored in memory 102 and capable of performing the graphics generation, motion-control program segment generation, collision checking and out-of-range checking functions is commercially available from a number of vendors. One embodiment of programming computer system 58 executes simulation software of this type available from Deneb Robotics Inc. of Auburn Hills Mich. (e.g. the IGRIP software package for abrasive applications). Other software functions typically available with simulation software of this type include computer aided design (CAD) functions. The executable calibration function is performed by calibration software that uses the stored calibration information described above to translate the model path point data from points referenced to the arm coordinate system to points referenced to the robot coordinate system. The creation of software for performing the calibration function is well within the abilities of those skilled in the art.

When it is desired to generate a motion-control program, processor 108 executes the calibration software stored in memory 102 (if needed) as a function of the model path points and the calibration information data stored in the data memory 100. The execution of the calibration software in this manner results in the generation of translated model path points referenced to the robot coordinate system. Using the translated model path points as input data, processor 108 can execute the conventional motion-control program segment generation software stored in memory 102 to generate motion-control program segments that will cause robot 12 to drive end effector 16 through a desired path of motion corresponding to the model path of motion. Motion-control program segments generated in this manner can be temporarily stored in data memory 100.

Similarly, processor 108 can execute force-control program segment generation software using the model force points stored in data memory 100 to generate force-control program segments that will cause force actuator 42 to drive backstand 40 through a desired force regime corresponding to the model force regime. Force-control program segments generated in this manner can be temporarily stored in data memory 100. The force-control program segments and corresponding motion-control program segments can be combined or assembled into the robot drive programs by the execution of the drive program assembly software, and stored in memory 100, before being downloaded to controller 14 for subsequent execution. The creation of software for performing the force-control program segment generation and drive program assembly functions described above is well within the abilities of those skilled in the art.

Using the robot, workstation and end effector model data stored in data memory 100, processor 108 can execute the conventional graphics generation program as a function of the motion-control program segments or drive programs to generate simulated motion program graphics data. The simulated motion program graphics data is applied to monitor 104 to create a simulated 3D visual image of the robot 12 driving the end effector 16 through the desired path of motion with respect to workstation 18. While executing the graphics generation program, processor 108 can also execute software performing the collision checking and out-of-range checking functions.

The collision checking function uses the robot, workstation and end effector model data (or desired subsets thereof), and determines whether the modeled portions of robot 12 and/or end effector 16 would collide or touch the modeled portions of workstation 18 as the robot drives the end effector through the path of motion represented by the motion-control program segments. If any collisions or near misses are identified, the software performing the collision checking function can generate textual messages on the monitor 104 or other controller display (not shown) describing the nature of the collisions. Alternatively, or in addition to the textual messages, embodiments of programming computer system 58 including simulated graphics capability can highlight the portions of the graphical image of robot 12, end effector 16 and/or workstation 18 involved in the identified collision to provide a visual description of the nature of the collision.

The out-of-range checking function uses the robot model data describing the robot kinematics to determine if the robot is physically capable of driving the end effector 16 through the path of motion represented by the motion-control program segments (i.e., whether the desired path of motion is within the robot operating range). Textual messages describing any out-of-range conditions identified through the execution of the out-of-range checking software can be displayed on the monitor 104 or other controller display (not shown). Alternatively, or in addition to the textual messages, embodiments of programming system 58 including simulated graphics capability can highlight the portions of the graphical image of robot 12 involved in the identified out-of-range condition to provide a visual description of the nature of the condition.

Programming computer system 58 can also be programmed to perform a number of model path point and model force point data manipulation functions. For example, mathematical curve fitting and filtering algorithms can be used to process the model path point and/or model force point data before the data is processed by the motion-control program segment and/or force-control program segment generation software, respectively, to optimize the motion paths and force regimes. The number of model path points and model force points processed to generate the motion-control program segments and force-control program segments, respectively, can be selectively reduced using mathematical algorithms, thereby increasing the efficiency by which the program segments can be generated and executed.

Lead-through robot programming system 50 offers considerable advantages. Through the use of an end effector model and an encoder such as a digitizing arm, a technician can easily and accurately lead the end effector model through a model path corresponding to the desired path of motion. The system is flexible and not restricted to use with any particular type of robot, or other multi-axis manipulator. This operation can be performed either on-line or off-line as dictated by the application. The digitizing arm is capable of accurately generating model path point data representative of the position and orientation of the end effector model at selected points on the desired path of motion. With the model path point data inputted to the programming system computer in this manner, motion-control program segments capable of accurately driving the robot and its end effector through the desired path of motion can be conveniently, quickly and efficiently generated. Accurate force-control and other path-synchronized parameter program segments can be conveniently, quickly and efficiently generated in a similar manner.

On the basis of visual feedback of the robot motion provided by simulated graphics on the monitor, and/or the information provided by the collision checking and out-of-range checking operations, the technician can efficiently use the programming system interface and the simulation software to refine and optimize the motion-control programs. The ability of the technician to observe simulated graphics of the motion of the robot and end effector as each location is taught also enables the technician to identify singularity point approaches. Using this information and the system interface, the motion-control program segments can be modified and optimized to prevent such singularity point approaches.

Furthermore, the ability of the technician to use visual feedback from the monitor as the simulated robot and end effector move along the model path of motion in real time from one model path point to the next enables relatively fast motion path adaptations. Once the calibration information data is generated and stored in memory as part of a programming system set-up procedure, subsequent programming operations can be performed off-line using a model of the end effector and workstation. The robot need not, therefore, be shut down to be reprogrammed.

The lead-through robot programming system of the present invention may also be used with plural workstations. For example, the present programming system could be used to program a robot to perform certain operations relative to a workpiece at each of several different workstations. Collision checking and out-of-range checking functions can be performed with respect to each of the various workstations.

Although the present invention has been described with reference to preferred embodiments, those skilled in the art will recognize that changes can be made in form and detail without departing from the spirit and scope of the invention. For example, although the invention is described with reference to a robot system in which the workpiece is a part being finished and moved with respect to the abrasive-type workstation (i.e., tool), this motion is relative and the end effector can include the tool while the workstation includes the fixed workpiece. Futhermore, because relative paths of motion and path-synchronized parameters are obtained using the programming system, the reference frames in which the motion is reproduced by the robot can be easily reversed. For example, although the end effector model is moved during the programming operation with respect to a fixed workstation during both programming and robot operation in the embodiment described above, the model path point data obtained during the programming operation can be used to generate motion-control program segments causing the robot to drive the "workstation" through the same relative path of motion with respect to a positionally fixed "end effector". In addition, although described with reference to a programming computer system that is separate from the robot controller, all the functions performed by the programming computer system can be performed by the controller if the controller has the necessary computing power capabilities.

I claim:

1. A system for programming a robot to drive an end effector through a series of desired path points along a desired path of motion with respect to a workstation, including:

a human-manipulable end effector model movable through a series of model path points along a model path of motion with respect to the workstation, the model path points and model path of motion corresponding to the desired path points and desired path of motion;

an encoder for providing model path point data representative of the position and orientation of the end effector model with respect to the workstation at each of the model path points as the end effector model is moved through the model path of motion;

video display means;

electronic memory for storing data, including:
simulation software memory for storing robot simulation and motion program generation software;
model path point memory for storing the model path point data; and
motion program memory for storing robot motion-control program segments; and a programmable computer coupled to the encoder, to the video display means, and to the electronic memory, including:
motion program processing means for executing the robot simulation and motion program generation software as a function of the model path point data to generate robot motion-control program segments for causing the robot to drive the end effector through the desired path of motion, and for storing the robot motion-control program segments in the motion program memory;
video processing means for executing the robot simulation and motion program generation software as a function of the model path point data and causing the video display means to generate a graphic display of the robot driving the end effector through the desired path of motion; and
an output port for communicating the robot motion-control program segments to the robot.

2. The system of claim 1 wherein the encoder includes a six degree of freedom digitizing arm coupled to the end effector model.

3. The system of claim 1 wherein:
the electronic memory further includes:
robot model memory for storing robot model data; and
range checking memory for storing robot out-of-range checking software; and
the programmable computer further includes:
out-of-range processing means for executing the out-of-range checking software as a function of the robot model data and the model path point data, for generating out-of-range determination data representative of whether the robot can drive the end effector through the desired path of motion represented by the motion-control program segments; and
out-of-range video processing means for causing the video display means to generate an out-of-range display as a function of the out-of-range determination data and representative of whether the robot can drive the end effector through the desired path of motion.

4. The system of claim 1 wherein:
the electronic memory further includes:
workstation model memory for storing workstation model data;
robot model memory for storing robot model data;
end effector model memory for storing end effector model data; and
collision checking memory for storing robot collision checking software; and
the programmable computer further includes:
collision processing means for executing the collision checking software as a function of the workstation model data, robot model data, end effector model data and the model path point data, for generating collision determination data representative of whether the robot can drive the end effector through the desired path of motion represented by the motion-control program segments free from collisions with the workstation; and
collision video processing means for causing the video display means to generate a collision display as a function of the collision determination data and representative of whether the robot can drive the end effector through the desired path of motion free from collisions with the workstation.

5. The system of claim 1 wherein:
the electronic memory further includes calibration memory for storing calibration data representative of the relative positions of the end effector model, robot and workstation, and
the motion program processing means includes means for executing the robot simulation and motion program generation software as a function of the model path point data and the calibration data to generate robot motion-control program segments for causing the robot to drive the end effector through the desired path of motion.

6. The system of claim 1 and further including a technician-actuated interface coupled to the programmable computer, for enabling interaction with the robot simulation and motion program generation software through visual feedback from the graphic display, and optimization of the motion-control program segments.

7. The system of claim 1 for programming the robot and a parameter-controllable device driven through a desired path-synchronized parameter regime as the end effector is driven through the desired path of motion, and wherein:

the system further includes a parameter sensor for providing model parameter point data representative of a model parameter regime as the end effector model is moved through the model path of motion, the model parameter regime corresponding to the desired parameter regime;

the electronic memory further includes:
model parameter point memory for storing the model parameter point data;
parameter program software memory for storing parameter-control program segment generation software; and
parameter regime memory for storing parameter-control program segments; and the programmable computer further includes:
parameter program processing means for executing the parameter-control program segment generation software as a function of the model parameter point data to generate parameter-control program segments for causing the parameter-controllable device to be driven through the desired parameter regime with respect to the end effector path of motion, and for storing the parameter-control program segmentss in the parameter regime memory.

8. The system of claim 1 for programming the robot to drive the end effector with respect to a workstation having a parameter-controllable device including an actuator for controlling the force between the workstation and the end effector and driving the workstation through a desired force regime with respect to the end effector as the robot drives the end effector through the desired path of motion, and wherein:

the parameter sensor includes a pressure sensor for providing model force point data representative of a model force regime between the end effector model and the workstation as the end effector model is moved through the model path of motion, the model force regime corresponding to the desired force regime;

the model parameter point memory includes memory for storing the model force point data;

the parameter program software memory includes memory for storing force-control program segment generation software;

the parameter regime memory includes memory for storing force-control program segments; and the parameter program processing means includes means for executing the force-control program segment generation software as a function of the model force point data to generate force-control program segments for causing the actuator to drive the workstation through the desired force regime with respect to the end effector, and for storing the force-control program segments in the parameter regime memory.

9. The system of claim 1 wherein:

the system is configured for off-line programming and further includes a workstation model; and the human-manipulable end effector model is movable through a series of model path points along a model path of motion with respect to the workstation model.

10. The system of claim 1 for programming a robot to move an end effector including a workpiece through the desired path of motion with respect to the workstation, and wherein the end effector model includes a replica of theworkpiece.

11. A system for programming a robot to drive an end effector through a series of desired path points along a desired path of motion with respect to a workstation, including:

a human-manipulable end effector model movable through a series of model path points along a model path of motion with respect to the workstation, the model path points and model path of motion corresponding to the desired path points and desired path of motion;

an encoder for providing model path point data representative of the position and orientation of the end effector model with respect to the work station at each of the model path points as the end effector model is moved through the model path of motion;

a video monitor;

electronic memory for storing data, including:
simulation software memory for storing robot simulation and motion program generation software;
robot model memory for storing robot model data;
range checking memory for storing robot range checking software;
model point memory for storing the model path point data; and
motion program memory for storing robot motion-control program segments; and a programmable computer coupled to the encoder and electronic memory, and including:
motion program processing means for executing the robot simulation and motion program generation software as a function of the model path point data to generate robot motion-control program segments for causing the robot to drive the end effector through the desired path of motion, and for storing the robot motion-control program segments in the motion program memory;
out-of-range processing means for executing the range checking software as a function of the robot model data and the model path point data, for generating out-of-range determination data representative of whether the robot can drive the end effector through the desired path of motion represented by the motion-control program segments; and
out-of-range video processing means for causing the video monitor to generate an out-of-range display as a function of the out-of-range determination data and representative of whether the robot can drive the end effector through the desired path of motion; and
an output port for communicating the robot motion-control program segments to the robot.

12. The system of claim 11 wherein:

the electronic memory further includes:
workstation model memory for storing workstation model data;
end effector model memory for storing end effector model data; and
collision checking memory for storing robot collision checking software; and the programmable computer further includes:
collision processing means for executing the collision checking software as a function of the workstation model data, robot model data, end effector model data and the model path point data, for generating collision determination data representative of whether the robot can drive the end effector through the desired path of motion represented by the motion-control program segments free from collisions with the workstation; and collision video processing means for causing the video monitor to generate a collision display as a function of the collision determination data and representative of whether the robot can drive the end effector through the desired path of motion free from collisions with the workstation.

13. The system of claim 12 wherein the encoder includes a six degree of freedom digitizing arm coupled to the end effector model.

14. A system for programming a robot to drive an end effector through a series of desired path points along a desired path of motion with respect to a workstation, including:

a human-manipulable end effector model movable through a series of model path points along a model path of motion with respect to the workstation, the model path points and model path of motion corresponding to the desired path points and desired path of motion;

an encoder for providing model path point data representative of the position and orientation of the end effector model with respect to the work station at each of the model path points as the end effector model is moved through the model path of motion;

a video monitor;

electronic memory for storing data, including:
  simulation software memory for storing robot simulation and motion program generation software;
  robot model memory for storing robot model data;
  end effector model memory for storing end effector model data;
  workstation model memory for storing workstation model data;
  collision checking memory for storing robot collision checking software;
  model point memory for storing the model path point data; and
  motion program memory for storing robot motion-control program segments;

a video monitor;

a programmable computer coupled to the encoder and electronic memory, and including:
  motion program processing means for executing the robot simulation and motion program generation software as a function of the model path point data to generate robot motion-control program segments for causing the robot to drive the end effector through the desired path of motion, and for storing the robot motion-control program segments in the motion program memory;
  collision processing means for executing the collision checking software as a function of the workstation model data, robot model data, end effector model data and the model path point data, for generating collision determination data representative of whether the robot can drive the end effector through the desired path of motion represented by the motion-control program segments free from collisions with the workstation; and
  collision video processing means for causing the video monitor to generate a collision display as a function of the collision determination data and representative of whether the robot can drive the end effector through the desired path of motion free from collisions with the workstation; and an output port for communicating the robot motion-control program segments to the robot.

* * * * *

UNITED STATES PATENT AND TRADEMARK OFFICE
CERTIFICATE OF CORRECTION

PATENT NO. : 5,495,410
DATED : February 27, 1996
INVENTOR(S) : Timothy L. Graf

It is certified that error appears in the above-indentified patent and that said Letters Patent is hereby corrected as shown below:

On the Cover Page, in the Abstract, line 22, "0the" should be --the--.

Col. 3, line 23, insert --is-- between "it" and "usually".

Col. 7, line 55, insert --(θ)-- between "rotation" and "with".

Col. 9, line 11, "dispaly" should read --display--.

Col. 17, line 23, delete the ":" after "includes".

Col. 17, line 31, "segmentss" should read --segments--.

Col. 18, line 5, insert a space between "the" and "workpiece".

Signed and Sealed this

Twenty-sixth Day of November 1996

Attest:

BRUCE LEHMAN

Attesting Officer     Commissioner of Patents and Trademarks